United States Patent
Schützmann

(10) Patent No.: US 7,860,293 B2
(45) Date of Patent: Dec. 28, 2010

(54) METHOD AND APPARATUS FOR DETERMINING THE AUTHENTICITY OF BANK NOTES

(75) Inventor: Jürgen Schützmann, Pfaffenhofen (DE)

(73) Assignee: Giesecke & Devrient GmbH, Munich (DE)

( * ) Notice: Subject to any disclaimer, the term of this patent is extended or adjusted under 35 U.S.C. 154(b) by 966 days.

(21) Appl. No.: 11/512,400

(22) Filed: Aug. 30, 2006

(65) Prior Publication Data

US 2007/0051868 A1 Mar. 8, 2007

(30) Foreign Application Priority Data

Aug. 30, 2005 (DE) .................. 10 2005 041 054

(51) Int. Cl.
 G06K 9/00 (2006.01)
(52) U.S. Cl. ..................................... 382/135
(58) Field of Classification Search .......... 382/137, 382/135, 140
 See application file for complete search history.

(56) References Cited

U.S. PATENT DOCUMENTS

| | | | | |
|---|---|---|---|---|
| 4,183,989 A | * | 1/1980 | Tooth ..................... | 428/195.1 |
| 4,451,521 A | | 5/1984 | Kaule et al. | |
| 5,367,577 A | | 11/1994 | Gotaas | |
| 5,974,150 A | * | 10/1999 | Kaish et al. ................ | 713/179 |
| 5,992,601 A | * | 11/1999 | Mennie et al. ............. | 194/207 |
| 6,024,202 A | | 2/2000 | Potter | |
| 7,209,223 B1 | * | 4/2007 | Hull et al. ................... | 356/73 |
| 7,510,699 B2 | * | 3/2009 | Black et al. ................. | 424/9.6 |
| 2003/0108074 A1 | | 6/2003 | Lawandy | |
| 2004/0029137 A1 | * | 2/2004 | De Lamberterie ........... | 435/6 |
| 2005/0239207 A1 | * | 10/2005 | Gelbart ..................... | 436/56 |

FOREIGN PATENT DOCUMENTS

| | | |
|---|---|---|
| DE | 31 21 484 A1 | 4/1982 |
| DE | 3121 484 A1 | 4/1982 |
| DE | 103 26 983 A1 | 12/2004 |
| EP | 0066854 | 12/1982 |
| EP | 0303725 | 2/1989 |
| EP | 1 158 459 A1 | 5/2000 |
| EP | 1 300 810 A2 | 9/2002 |
| EP | 1291828 | 3/2003 |
| EP | 1 316 924 A1 | 6/2003 |
| WO | WO 99/38701 | 8/1999 |
| WO | WO 99/38703 | 8/1999 |
| WO | WO 00/46742 | 8/2000 |
| WO | WO 02/070279 A1 | 9/2002 |
| WO | WO 2004/102490 A1 | 11/2004 |

* cited by examiner

*Primary Examiner*—Matthew C Bella
*Assistant Examiner*—Dennis Rosario
(74) *Attorney, Agent, or Firm*—Bacon & Thomas, PLLC

(57) ABSTRACT

Forged bank notes are no longer reliably distinguishable from bank note originals (BN) on the basis of their luminescent fibers. According to the invention, the excitation of the fibers to luminescence is effected by means of excitation radiation (S) from the restricted wavelength range from 600 to 640 nm or from 520 to 550 nm, since the forgeries do not luminescence in this range but the originals luminescence red. Detection is therefore effected in the wavelength range from 640 to 700 nm.

21 Claims, 1 Drawing Sheet

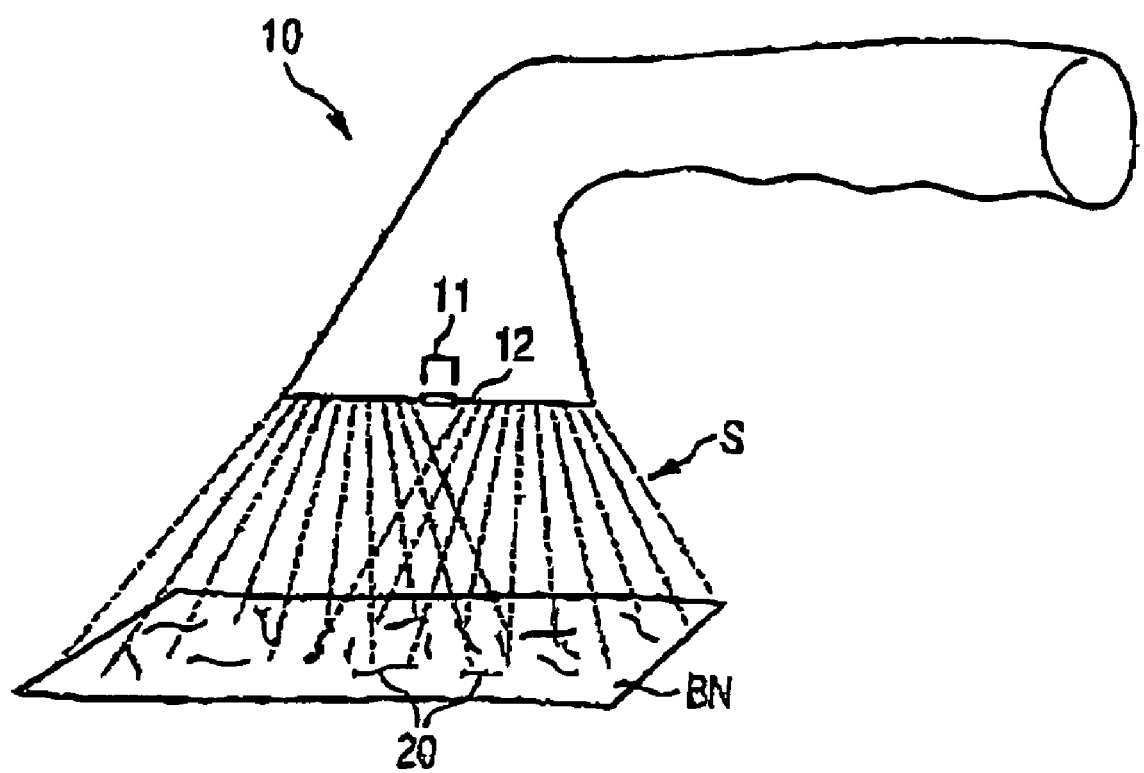

METHOD AND APPARATUS FOR DETERMINING THE AUTHENTICITY OF BANK NOTES

The present invention relates to a method for checking the authenticity of bank notes and to a checking apparatus suitable therefor.

It is now usual to protect bank notes against forgery by means of luminescent substances. The luminescent substances can be added to the bank note paper and/or the bank note print. Frequently, the luminescent substance is also contained in colored or colorless fibers distributed within the substrate material, so-called mottling fibers.

Depending on the type of luminescent substance—they include both fluorescent and phosphorescent substances—the substance emits in a defined spectral range when it is irradiated by means of radiation from a likewise defined spectral range. The excitation radiation can be both in the visible and the invisible spectral range. Likewise, the emitted luminescence radiation can be in the visible or invisible spectral range. The two radiations must not overlap, however, since otherwise the luminescence radiation cannot be distinguished from the excitation radiation, at least in the case of fluorescent substances.

Such authenticity features act not only as copy protection, but are, or at least have been in the past, difficult to imitate because of the complexity of the luminescent substances. Nowadays, however, there are also forgeries in circulation that contain such luminescent substances, even in the form of mottling fibers distributed within the document. There are thus high-quality US dollar forgeries containing luminescent fibers that are excitable to luminescence in the same wavelength range as original US bank notes and also emit luminescence radiation in the same wavelength range as the original bank notes. Excitation of the red mottling fibers contained in US bank notes from the 1996 issue and of the red and blue mottling fibers contained in the US bank notes from the 2004 issue is possible in the relatively broadband range from at least 500 to 640 nm. The emitted fluorescence radiation, in contrast, is roughly between 600 nm and 700 nm. There is thus an overlap range between about 600 and 640 nm, that is, luminescence at e.g. 620 nm is effected by excitation at shorter wavelengths. Since the forgeries are also excitable and emit in the stated ranges, forgeries can no longer be readily distinguished from originals by this authenticity feature. The same applies to the current Russian ruble bank notes, which use the same or similar fibers. It is possible that further currencies are already being equipped with corresponding fibers today or will be in the future.

One alternative for solving this problem is to develop and use novel luminescent substances having very characteristic properties. For example, the prints EP 0 066 854 A1, WO 99/38701 and WO 99/38703 propose special luminescent substances with specific absorption and emission properties. However, it is hardly feasible to use novel luminescent substances in bank notes whenever the hitherto used luminescent substances are successfully imitated. It instead makes sense for economic reasons to delay the time of the next new issue as long as possible.

It is therefore the problem of the present invention to find a simple solution to the problem that the luminescent substances used in bank notes will sooner or later be successfully imitated by forgers, thereby making the luminescent substances unsuitable as an authenticity feature.

This problem is solved according to the invention by a method and a checking apparatus having the features of the coordinated claims. Advantageous embodiments and developments of the invention are stated in the respective dependent claims.

The invention is based on the finding that the luminescent substances of the imitated bank notes do not have exactly the excitation and emission behavior of the luminescent substances used in the original bank notes. With respect to the above-specified mottling fibers as used for example in US bank notes, this means that the forgeries on the market at present do not emit any luminescence radiation when they are irradiated with excitation radiation from the restricted wavelength range from 600 to 640 nm. The original bank notes, in contrast, are excited to emit red luminescence radiation upon such excitation radiation. Thus, if the luminescence radiation is detected (at least also) in the wavelength range from 640 to 700 nm, for example by means of the human eye as a visual inspection, original and forgery can be reliably distinguished. The authenticity check is rated positive if the luminescence radiation appears red. If the luminescence radiation is detected by sensor, this detection is preferably restricted to the specific wavelength range from 640 to 700 nm.

The same applies to excitation in the wavelength range from 520 to 550 nm and detection of the luminescence radiation at 640 to 700 nm. A combination of the excitation wavelengths is also conceivable, so that the luminescence radiation at 640 to 700 nm is detected alternately under the excitation in the wavelength ranges from 520 to 550 nm and 600 to 640 nm.

In all cases it is advantageous to filter out the excitation radiation that can be reflected partly by the bank note to the detector or to the viewer, by means of a long-pass filter during detection of the luminescence radiation. The long-pass filter should preferably have a transmission of at most 10% at a wavelength under 610 nm, and a transmission of at least 50% at a wavelength over 630 nm.

The present invention can not only be applied in connection with the stated luminescent fibers having an excitation spectrum in the wavelength range from 500 to 640 nm, as used e.g. in US bank notes, but is also suitable for other bank notes containing luminescent substances having a broadband excitation spectrum, i.e. in particular an excitation spectrum in a wavelength range of at least 100 nm. For such fibers particularly involve the danger of forgeries appearing that are at least also excitable in this excitation spectrum. Correspondingly, the invention is also not restricted to the checking of bank notes that emit in the wavelength range from 600 to 700 nm, as is the case e.g. with the luminescent fibers used in US bank notes, but is also suitable for other broadband emitting luminescent substances, in particular those emitting in a wavelength range of at least 100 nm.

A corresponding checking apparatus, which is preferably formed for flexible use as a handy, i.e. hand-held, apparatus, therefore comprises at least one excitation radiation source for emitting radiation from the restricted wave range from 600 to 640 nm to thereby excite the bank note to emit the luminescence radiation.

Furthermore, the checking apparatus advantageously has the aforementioned long-pass filter for blocking radiation from the excitation radiation range, whereby the long-pass filter must be disposed relative to the excitation radiation source such that luminescence radiation emitted by the bank note is detectable through the long-pass filter, either by sensor or by means of the human eye.

In the case of detection of the emitted luminescence radiation by sensor, the checking apparatus furthermore has a detector that is sensitive at least in the wavelength range from 640 to 700 nm. The sensitivity of the detector is preferably restricted to said wavelength range.

The invention will hereinafter be explained by way of example with reference to FIG. 1.

FIG. 1 shows a checking apparatus 10 for checking the authenticity of a bank note BN which is equipped with mottling fibers 20 containing substances excitable to emit luminescence radiation. The checking apparatus 10 is formed as a hand-held unit for individual, flexible and mobile use. It can for example be battery-operated, but also have an electrical connection not shown here.

The checking apparatus is used to irradiate the bank note BN with luminescence radiation S from the desired wavelength range as excitation radiation (600 to 640 nm). It is possible to use for this purpose for example a HeNe laser or laser diodes (633 nm). It is also possible to use corresponding LEDs with an emission peak at 633 nm.

A detector 11 detects the radiation emitted by the bank note. If the check is done in the dark, this is substantially the luminescence radiation of the mottling fibers 20. If the excitation radiation is not absorbed or transmitted by the bank note BN, said radiation also comprises reflected fractions of the excitation radiation S. To block said excitation radiation fractions, a long-pass filter 12 is provided in the beam path before the detector 11, which passes wavelengths under 610 nm no more than 10% and passes wavelengths over 630 nm at least 50%. A suitable filter is for example one from Schott with the designation RG 630. Since the detector 11 has high sensitivity in the wavelength range from 640 to 700 nm, the luminescence radiation of the mottling fibers 20 can be reliably detected in this way. To suppress longer-wave radiation >700 nm, corresponding filters can be used such as a filter from Schott with the designation BG 40 with a transmission of <10% for wavelengths greater than 720 nm. The mottling fibers of forged bank notes, in contrast, are not excitable to luminescence in the red spectral range in the stated excitation spectrum.

Instead of using the detector 11, the luminescence radiation can of course also be detected with the naked eye. In this case, the long-pass filter 12 is to be disposed in a corresponding place such that the bank note BN irradiated with the excitation radiation S can be viewed through the long-pass filter 12.

The invention claimed is:

1. A method for checking the authenticity of bank notes (BN) equipped with substances excitable to emit luminescence radiation as an authenticity feature, comprising the steps of:
   exciting the emission by means of excitation radiation from the restricted wavelength range from 600 to 640 nm or 520 to 550 nm, and
   detecting the emitted luminescence radiation at least also in the wavelength range from 640 to 700 nm wherein the emission is effected alternately in the excitation ranges from 600 to 640 nm and from 520 to 550 nm, and the luminescence radiation is detected from 640 to 700 nm.

2. The method according to claim 1 used for checking those bank notes in which the substances have a broadband excitation spectrum and/or a broadband emission spectrum.

3. The method according to claim 2, wherein the excitation spectrum comprises a wavelength range of at least 100 nm.

4. The method according to claim 3, wherein the excitation spectrum comprises at least the wavelength range from 500 to 640 nm.

5. The method according to claim 2, wherein the emission spectrum comprises a wavelength range of at least 100 nm.

6. The method according to claim 2, wherein the emission spectrum comprises at least the wavelength range from 600 to 700 nm.

7. The method according to claim 1, wherein in the step of detecting the luminescence radiation, fractions of the excitation radiation are blocked by means of a long-pass filter.

8. The method according to claim 1, used for checking the authenticity of US bank notes.

9. The method according to claim 8, wherein the bank notes are the issues of either or both 1996 and 2004.

10. The method according to claim 1, used for checking the authenticity of Russian ruble bank notes.

11. The method according to claim 1, wherein the step of detecting the luminescence radiation is restricted to the wavelength range from 640 to 700 nm.

12. The method according to claim 1, including the step of rating the authenticity check as positive if the luminescence radiation appears red.

13. The method according to claim 12, wherein the step of detecting the luminescence radiation is effected by means of the human eye.

14. A method for checking the authenticity of bank notes (BN) equipped with substances excitable to emit luminescence radiation as an authenticity feature, comprising the steps of:
   exciting the emission by means of excitation radiation from the restricted wavelength range from 600 to 640 nm or 520 to 550 nm, and
   detecting the emitted luminescence radiation at least also in the wavelength range from 640 to 700 nm,
   wherein in the step of detecting the luminescence radiation, fractions of the excitation radiation are blocked by means of a long-pass filter,
   wherein a long-pass filter is used which has a transmission of at most 10% at a wavelength under 610 nm, and a transmission of at least 50% at a wavelength over 630 nm.

15. A checking apparatus for checking the authenticity of bank notes equipped with substances excitable to emit luminescence radiation as an authenticity feature, comprising an excitation radiation source for emitting radiation from the restricted wavelength range from 600 to 640 nm or from 520 to 550 nm to thereby excite the bank notes to emit the luminescence radiation exciting the emission by means of excitation radiation from the restricted wavelength range from 600 to 640 nm or 520 to 550 nm, and
   wherein the emission is effected alternately in the excitation ranges from 600 to 640 nm and from 520 to 550 nm, and the luminescence radiation is detected from 640 to 700 nm.

16. The checking apparatus according to claim 15, including a long-pass filter for blocking radiation from an excitation radiation range, which is disposed relative to the excitation radiation source such that luminescence radiation emitted by the bank note is detectable through the long-pass filter.

17. The checking apparatus according to claim 16, wherein the long-pass filter is so disposed that the luminescence radiation emitted by the bank note irradiated with the excitation radiation is detectable through the long-pass filter by means of the human eye.

18. The checking apparatus according to claim 15, including a detector for detecting radiation in the wavelength range from 640 to 700 nm.

19. The checking apparatus according to claim 18, wherein the detector is restricted to the detection range from 640 to 700 nm.

20. The checking apparatus according to claim 15, configured as a hand-held apparatus for flexible use.

21. A checking apparatus for checking the authenticity of bank notes equipped with substances excitable to emit luminescence radiation as an authenticity feature, comprising an excitation radiation source for emitting radiation from the restricted wavelength range from 600 to 640 nm or from 520 to 550 nm to thereby excite the bank notes to emit the luminescence radiation, including a long-pass filter for blocking radiation from the excitation radiation range, which is disposed relative to the excitation radiation source such that luminescence radiation emitted by the bank note is detectable through the long-pass filter, wherein the long-pass filter has a transmission of at most 10% at a wavelength under 610 nm, and a transmission of at least 50% at a wavelength over 630 nm.

* * * * *